United States Patent
Cheung (10) Patent No.: US 6,532,197 B1
(45) Date of Patent: Mar. 11, 2003

(54) AUTOMATIC DATA DISC STORAGE AND SELECTION SYSTEM

(76) Inventor: Wing Sang Cheung, Flat D, 11th Floor, Tower 2, Tsing Yung Terrace, 8 Tsing Yung Street, Tuen Mun, New Territories (HK)

( * ) Notice: Subject to any disclaimer, the term of this patent is extended or adjusted under 35 U.S.C. 154(b) by 0 days.

(21) Appl. No.: 09/538,075

(22) Filed: Mar. 29, 2000

(30) Foreign Application Priority Data

Nov. 1, 1999 (EP) .............................................. 99308657

(51) Int. Cl.$^7$ .............................................. G11B 17/22
(52) U.S. Cl. .................................. 369/30.32; 369/30.76
(58) Field of Search ................................ 369/30.28, 76, 369/77.1, 30.32, 30.76

(56) References Cited

U.S. PATENT DOCUMENTS

| | | | | |
|---|---|---|---|---|
| 4,386,386 A | * | 5/1983 | Akita | 361/283 |
| 4,633,452 A | * | 12/1986 | Shimbo et al. | |
| 5,016,236 A | * | 5/1991 | Cho | 369/75.2 |
| 5,276,668 A | * | 1/1994 | Kinoshita et al. | 369/75.2 |
| 5,664,146 A | * | 9/1997 | Bolin et al. | 71/115 |
| 5,778,374 A | * | 7/1998 | Dang et al. | 707/101 |
| 5,818,802 A | * | 10/1998 | Menke et al. | 369/179 |
| 5,864,532 A | * | 1/1999 | Nakamichi | 369/30.77 |
| 5,903,538 A | * | 5/1999 | Fujita et al. | 369/178 |

* cited by examiner

*Primary Examiner*—Aristotelis M. Psitos
(74) *Attorney, Agent, or Firm*—Jackson Walker L.L.P.

(57) ABSTRACT

A disc storage system includes an automated disc storage unit capable of storing a large number of discs in respective individual slots. A disc player, which is incorporated in a personal computer housing, is connected via a hard-wire connection to the unit. A keyboard and a screen of the personal computer are used to control the unit and to display information corresponding to status of the unit. The computer is programmed to control the unit to eject selected discs under instructions of a user and to manage the retrieval and storage of the discs at all times. A very large number of discs can be stored and retrieved automatically and up-to-date records kept, and displayed if required, for convenient use as required.

2 Claims, 8 Drawing Sheets

AUTOMATIC DATA DISC STORAGE AND SELECTION SYSTEM

BACKGROUND OF THE INVENTION

1. Field of the Invention

The invention relates to storage system for discs.

2. Description of Prior Art

Compact discs for use in music centres players have been known for many years and represented, and when first produced, not only enhanced quality of recording, but also provided a medium less prone to damage. The audio signals recorded on compact discs are in digital form, which enabled the compact disc to evolve into varieties of digital data storage media such as CD ROM, video CD, etc. Significantly more audio, video, and other data could be stored in less space. Even so, efforts have been made to reduce the overall space required by packing discs into small protective containers and more recently providing large storage units that store the discs without a need for individual containers or protective boxes. Common or larger storage units were developed to enable discs to be automatically loaded as may be required for continuous playing in a public place or in a motor vehicle without supervision or man-handling, for example. These developments have lead to storage units, that may require some man-handling, but where tens or hundreds of discs can be stored for use at a point-of-need. While large storage units have clear attractions they suffer from a major disadvantage, apart from the difficulty in logging their location in the store, because the discs cannot be visually identified. In some cases, the disc may carry or be marked with visual identifying information but such markings are not visible from outside the storage unit. This problem has meant that large storage units are not popular or practical, or the sizes of the storage units have been kept relatively small. The same observations apply to storage units for floppy discs, digital versatile discs, mini discs, and the like, and the present invention is applicable to all such discs as well as compact discs.

SUMMARY OF THE INVENTION

It is an object of the invention to overcome or at least reduce this problem.

According to the invention there is provided a disc storage system comprising an automated disc storage unit capable of storing a large number of discs in respective individual slots and means for detecting the presence of a disc in each slot and means for transmitting the result of disc detection to an external computer and means for selectively ejecting each disc under the control of an external signal, a disc players a storage system computer programmed to operate the disc player and to accept the disc detection result signals transmitted by the disc storage unit and to provide the external signals for the storage unit, and a non-volatile memory controlled by the computer for storing identifying information of each disc and a slot location where each disc is inserted.

The computer may be programmed to monitor the disc detection result signal transmitted by the disc storage unit for keeping a record of the location of each disc.

The computer may be programmed to provide the said external signals.

The disc player may comprise a disc player conventionally provided in a personal computer for other normal usage, and in which the non-volatile memory is part of a memory of the personal computer.

The disc storage unit may comprise a slotted plastic frame for receiving a disc in each slot and includes a sheet of protective material that surrounds each disc in the slot.

A disc sensor may be included that comprises a plurality of mechanical springs, one for each disc, arranged to mechanically bias the discs into slots in the disc storage unit, and electrical circuit means for sensing the relative position of each spring.

A fixed electrode for each spring may be provided, in which the electronic circuit responds to a capacitive coupling between each spring and a corresponding electrode which significantly increases in value due to a disc in the slot pressing the spring to adjacent the electrode.

The disc storage system may include two or more disc storage units connected in cascade to form a larger capacity storage unit.

Multiple disc storage units of the present invention can store a large number of discs in a small volume by containing only the discs without their normal individual protection boxes. The units also have sensors and electromechanical mechanisms inside so that the insertion and retrieval of every disc can be kept track of and controlled by a disc management software programme. More than one multiple disc storage units can be cascaded together electrically to form a larger unit to store more discs.

The identification information of the discs can be stored electronically in non-volatile memory means in the form of database records, instead of in conventionally printed records kept in the disc protection boxes. The identification information of a disc is a small subset of the digital data recorded on the disc. The information is read from the disc by the disc management software during the disc management process through the disc player. The user can also add additional particular information such as price, date of purchase, graphics, icons, etc., to the disc records.

The disc management software keeps track of the storing/retrieval of every disc, such information updating the corresponding disc records, and provides an interface to the user with advanced disc management functions such as automatic disc searching, categorizing, sorting, disc information browsing/listing/printing, etc. Even though physically hundreds of different kinds of discs may be mixed together and stored randomly inside the multiple disc storage units, the disc management software can provide a neatly categorized and sorted view of the disc records to the user.

BRIEF DESCRIPTION OF THE DRAWING

A disc storage system according to the invention will now be described by way of example with reference to the accompanying drawings in which.

DESCRIPTION OF THE PREFERRED EMBODIMENTS

The multiple disc storage unit is applicable for use with any kind of removable mass storage media including optical discs, magnetic discs, and magnetic tape cartridges. Multiple disc storage units are already well-known and can store in some cases one hundred or more discs at any one time. The storage unit descried is cascadable to any desired number of units as a single system for storing a large number of discs. Each disc is inserted manually by the user into any empty slot of the multiple disc storage unit without their (normal) protective pockets or covers. Upon detection of the insertion of the disc, the multiple disc storage unit transmits a signal to a built-in or external computer (the signal may go to the computer via another multiple disc storage unit in case of a cascaded unit), indicating that a disc has been inserted in the detected location. The multiple disc storage unit can also selectively release any of the stored discs on receipt of a series of command signals from the built-in or external computer. Usually the signals are transmitted and received via hard-wire connections but infra-red and radio signals, for example, may be used if necessary or preferred. The invention can also be extended to a tray operated storage unit which, upon receipt of certain command signals from the computer, automatically slides in or slides out a selected tray holder instead of acting directly on the discs.

In the described storage system, a disc player (CD ROM drive) incorporated in a personal computer is used, and a normal keyboard made use of to initiate and to control, under the supervision of a user, operation of the storage system. If necessary, the system may be provided with a dedicated disc player, a self-contained multiple disc storage unit which has a built-in computer running a disc management software, a built-in keyboard, a built-in display, and a built-in non-volatile disc information database memory. However, in a normal or preferred arrangement, the system is provided without the dedicated disc player, the built-in computer, keyboard, display, and database memory. The preferred arrangement is provided with a multiple disc storage unit equipped with a communication port for connecting to a personal computer, and a separate piece of disc management software to be run on that computer in order to make use of the computer's keyboard, display, a non-volatile hard disc memory, and a disc player of the computer.

Figure 1:
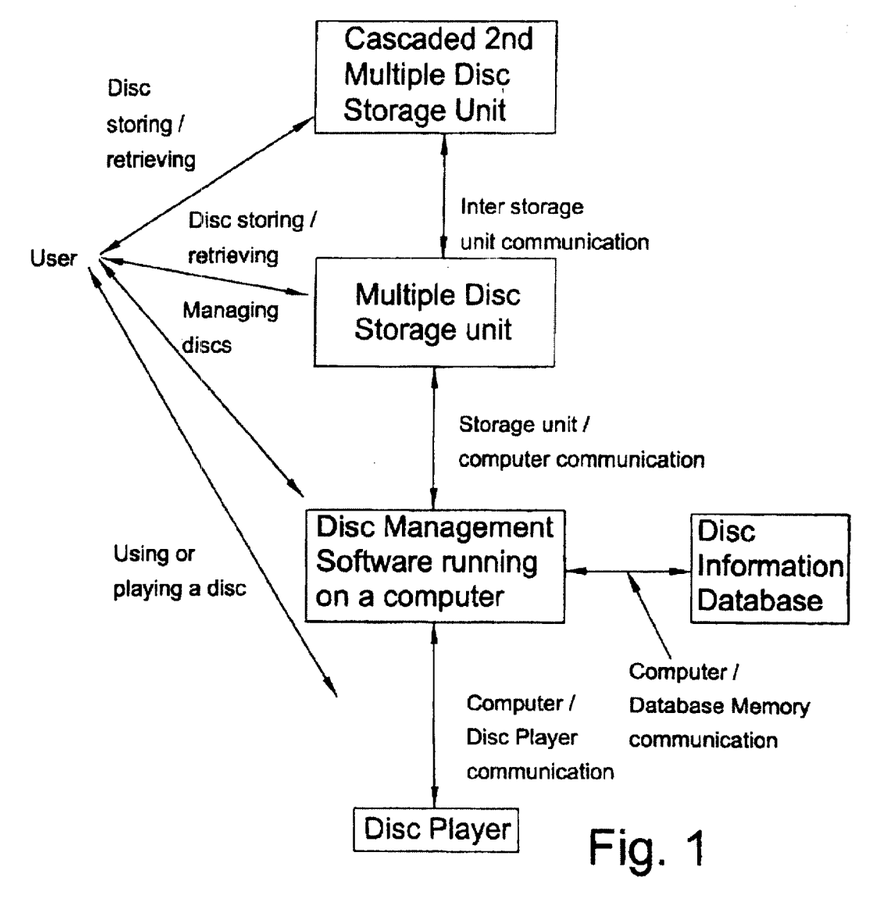
FIG. 1 is a block diagram of the system.

Referring to the drawings, in FIG. 1 an overall layout is shown identifying various components that can each interface with a user.

Figure 2:
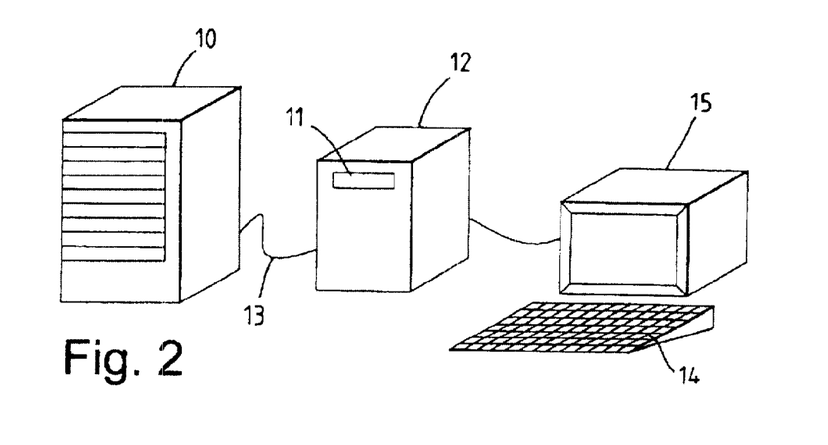
FIG. 2 is a schematic layout of the system.

Referring to FIG. 2, the system includes a multiple disc storage unit 10 which has fifty slots for storing fifty (bare) compact discs. The multiple disc storage unit 10 is arranged to monitor the presence of a disc in any of its slots and can eject any selected disc from its slots in response to an external signal. A disc player 11, normally incorporated in a personal computer housing 12, is electrically connected to the multiple disc storage unit via a communication cable 13. A part of disc management software, which is running in the personal computer 12, manages the multiple disc storage unit 10, a disc information database stored in a non-volatile hard disc memory inside the personal computer 12, and the disc player 11, and provides an interface to the user to use the system through the computer's keyboard 14 and a display monitor 15. The overall system is arranged so that a large number of discs can be stored in the storage unit 10, and the location and identification information of every disc is continuously up-dated as required for efficient management, and ready use of selected discs, when required. When preferred, the resources of the system can be made available to be used by other software running on the same computer via the functions provided by the disc management software.

Figure 3:
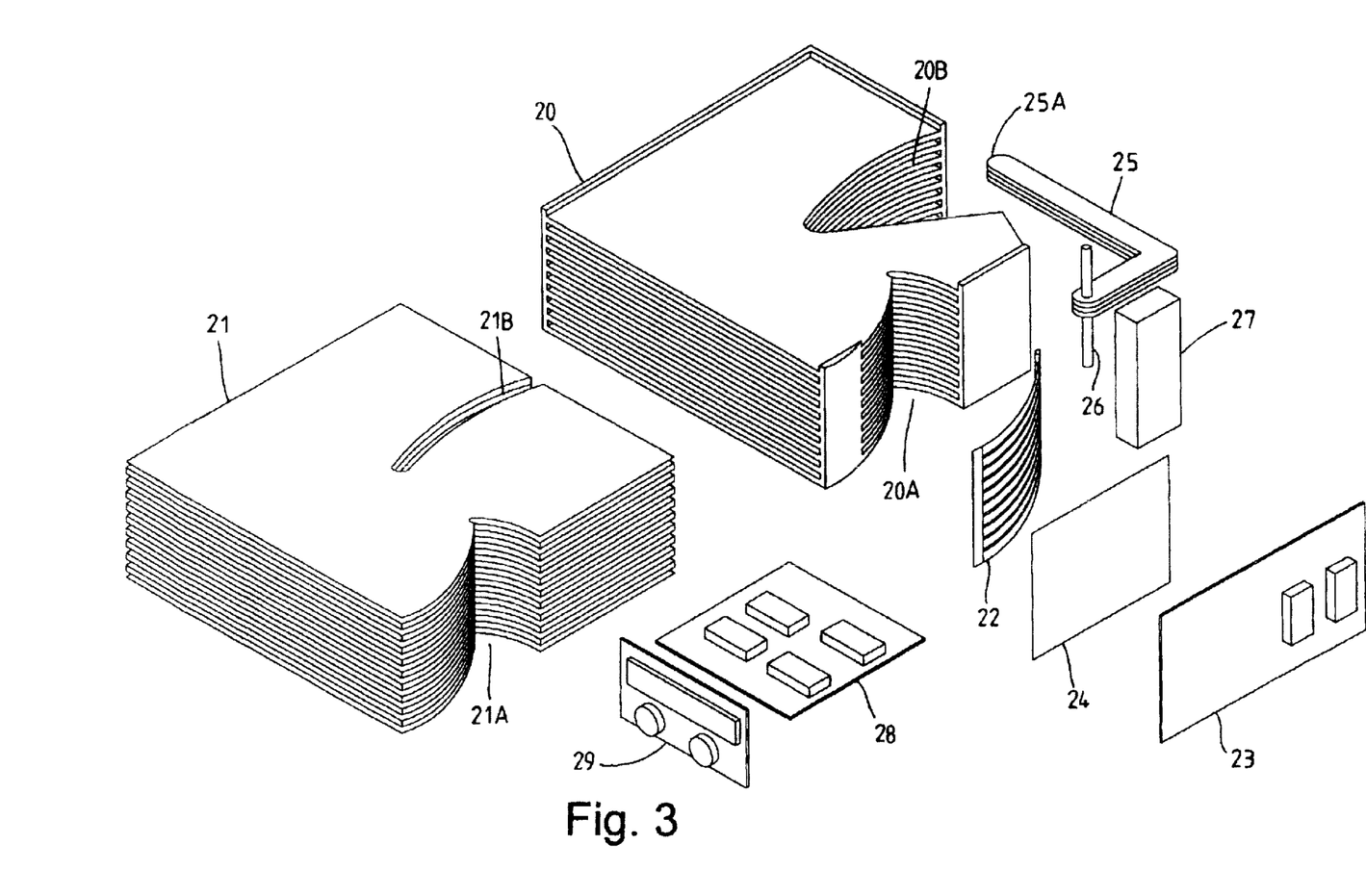
FIG. 3 is an exploded view of mechanical components of a multiple disc storage unit.

In FIG. 3, the mechanical construction of a ten slot (that can be extended to any number of slots) multiple compact disc storage unit is depicted. A plastic slotted frame 20 has two cutouts, 20A and 20B. A piece of folded anti-static disc protection material sheet 21 is assembled in use into the slots of the plastic frame 20 with cutouts 21A aligned with cutouts 20A, and arc shaped slits 21B are totally exposed within the cutout 20B. Thus, when a disc is inserted into a slot, both surfaces of the disc are protected by a folded anti-static disc protection sheet from scratching and static electricity build up.

A metallic multi-spring 22 is assembled adjacent the cutout 20A so that every slot is aligned with a disc holding spring which is bent outwards by a respective inserted disc, providing a force that holds the disc at its innermost position. A spring sensor printed circuit board 23 is installed adjacent the metallic multi-spring 22 and separated by an electrically insulating dielectric sheet 24. The spring sensor circuit board 23 is printed with copper track patterns which, together with the dielectric sheet, forms with every disc holding spring an electrical capacitor. The capacitance of each capacitor depends on the bending position of the corresponding spring. An appropriate electronic circuit detects the capacitance of the capacitors, and hence detects the relative position of every spring.

A disc ejector arm 25, which can be moved up and down as well as rotated about an axle 26, is installed near the cutout 20B. When the disc ejector arm is rotated totally out of the cutout 20B, it can be moved freely up and down without touching the frame 20. When the vertical position of the disc ejector arm is aligned to a slot, it can be rotated into the cutout 20B, to eject the disc stored in that slot partially out of the unit for the user to take away. The construction of the disc ejector arm 25 together with the design of the arc shaped ejection slit of the anti-static disc protection sheet 21 prevents the two adjacent discs, above and below the disc to be ejected, from being scratched by the arm. The disc ejector arm consists of an "L" shaped hard material arm. Each element of the arm enters the cutout 20B and only takes the space of one slot. Only the end 25A that connects the two elements can touch the edge of the disc to be ejected to push the disc along the ejection slit 21B during the ejection operation. The movement and accurate positioning of the disc ejector arm is done by means of an ejector arm driving unit 27 inside which is an assembly of motors, gears, position sensors, and electrical wires/connectors, known per se.

Figure 4:
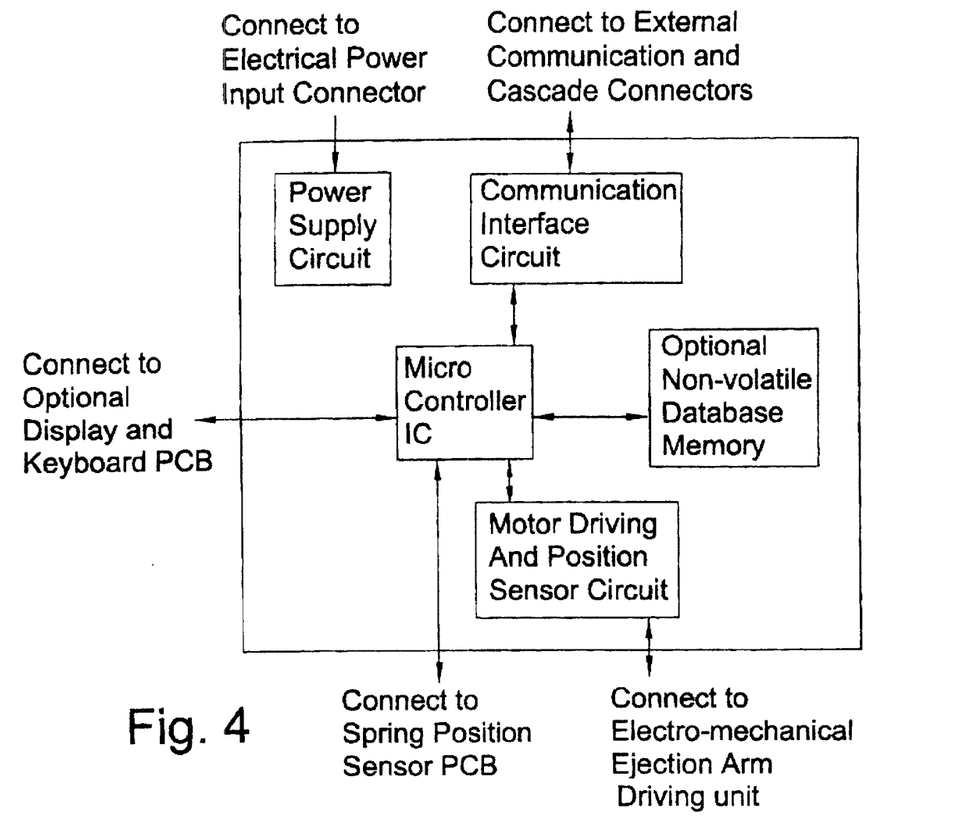
FIG. 4 is a block diagram of a controller for the multiple disc storage unit.

The spring sensor printed circuit board 23, the electromechanical ejector arm driving unit 27, and an optional local display and keyboard PCB 29, are electrically connected to a controller unit 28 which has a block diagram illustrated in FIG. 4. Also connected to the controller (but not shown in the Figures) is a connector for an electric power supply, a connector for the computer connection, and a connector for cascading to another multiple disc storage unit.

In FIG. 4, the controller unit 28 contains a microcontroller integrated circuit which is programmed to perform the following functions:

Transmit/receive signals to/from the external computer via the Communication Interface Circuit.

Transmit/receive signals to/from the cascaded storage unit via the Communication Interface Circuit.

Generate necessary control signals to the spring position sensor PCB to determine the position of every spring.

Together with the Motor Driving and Position sensor circuit, generate control signals to the ejector arm driving unit to accurately move the ejector arm to eject discs.

Store/retrieve Disc Information Records to/from the optional non-volatile Database Memory.

Accept signals from an optional built-in keyboard.

Generate necessary signals to drive the optional built-in display to show information to the user.

Figure 5:
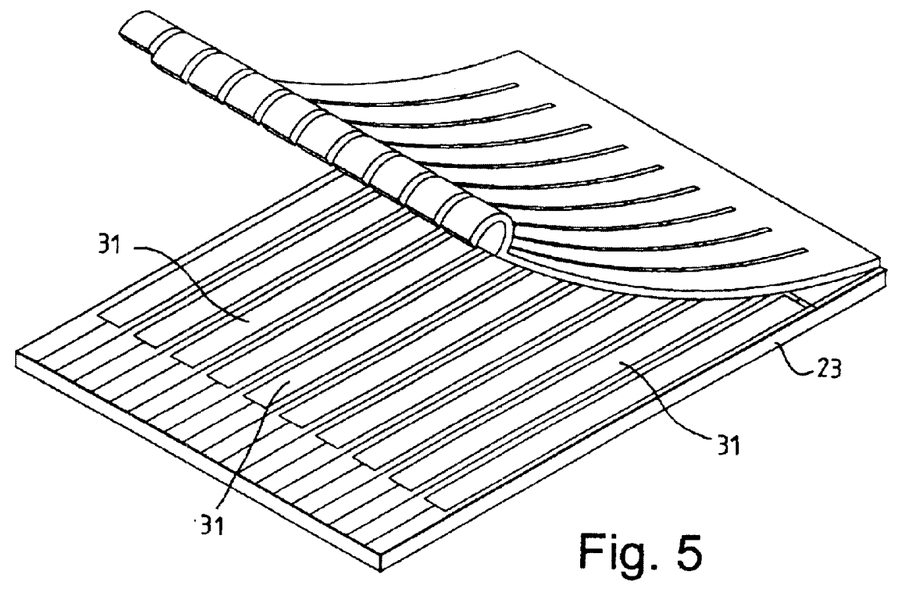
FIG. 5 is an isometric view of a metallic spring disc position sensor.

In FIG. 5, the spring sensor printed circuit board 23 is a pattern of copper foil tracks printed on the circuit board. Not shown in the diagram is a sheet of electrically insulating dielectric sheet placed between the springs and the printed copper track pattern. When there is no disc in a slot, the corresponding spring will be at a position relatively far away from the corresponding printed copper track such that electrical capacitance between the spring and a respective copper track is negligibly small. When a disc is inserted, the spring will be pushed by the inserted disc towards the circuit board so as to touch the thin piece of dielectric sheet. This increases the capacitance to a level which is readily detectable by a detection circuit shown in FIG. 6.

Figure 6:
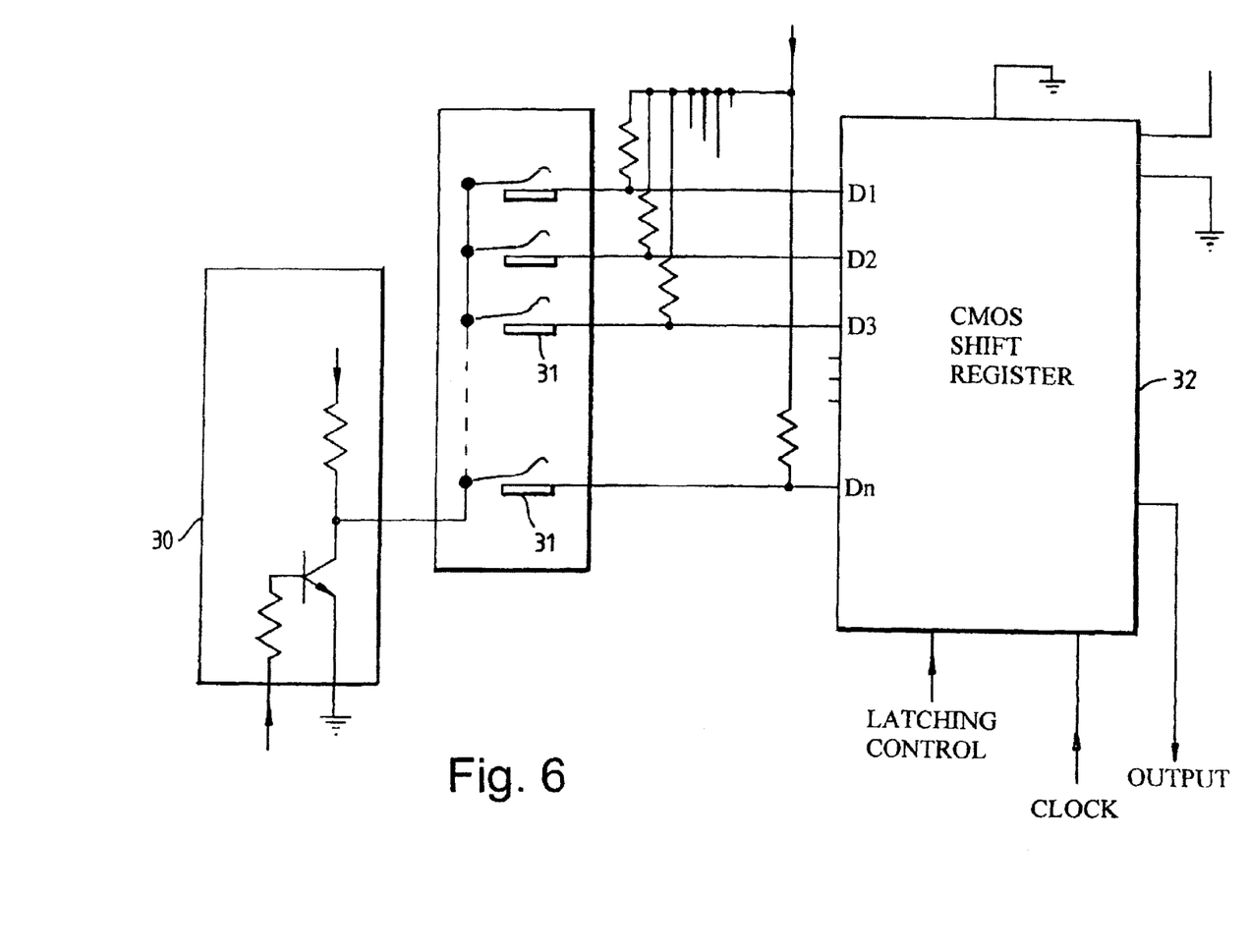
FIG. 6 is a circuit diagram for the disc position sensor.

In FIG. 6, each metallic spring on the printed circuit board 23 is connected to an electrical voltage step signal generator 30 which generates an electrical voltage step at the beginning of each sensing procedure. If a disc is present in a slot, the electrical capacitance between the corresponding spring and a copper foil or electrode 31 will be large enough to cause a binary digital state of the copper track to be inverted for a short period of time by the electrical voltage change at the spring. Inversely, in the absence of a disc, the electrical capacitance between the spring and the copper track will be negligibly small so that the binary digital state of the copper track will not be changed. Just after the application of each voltage step to the springs, the binary digital state of all copper tracks are latched into a parallel-in-serial-out Complementary Metal Oxide Semiconductor (CMOS) shift register 32. The content of the shift register can be read by the controller unit 28 (see FIG. 3) in order to determine the presence or absence of a disc in every slot. The serial input of the shift register is connected to a binary digital state opposite to the static binary digital state (the binary digital state when no voltage step is applied to the springs) of the copper tracks. Thus, the controller can determine the number of slots of the storage unit by latching the static binary digital states of all copper tracks into the shift register and then counting the number of shifting clock pulses necessary to make the serial output of the shift register change state. The described design of the spring sensor printed circuit board has several distinct advantages over other sensing methods using mechanical switches or optical sensors for example. The advantages include:

Dual function of the metallic springs as a disc holding spring and a disc sensing element, leading to very low cost for a large amount of sensors.

Contactless sensing greatly increases reliability and durability over mechanical switches.

The sensing circuit can be used for determining the total number of slots in the storage unit.

FIGS. 7, 8, 9 and 10 outline the flow of disc management operations. The disc management software handles four types of events—(1) the placement of a disc into the player, (2) the insertion of a disc into the Multiple Disc Storage Unit, (3) the disc retrieval command issued by the user, and (4) the ejection of the disc from the player.

Figure 7:
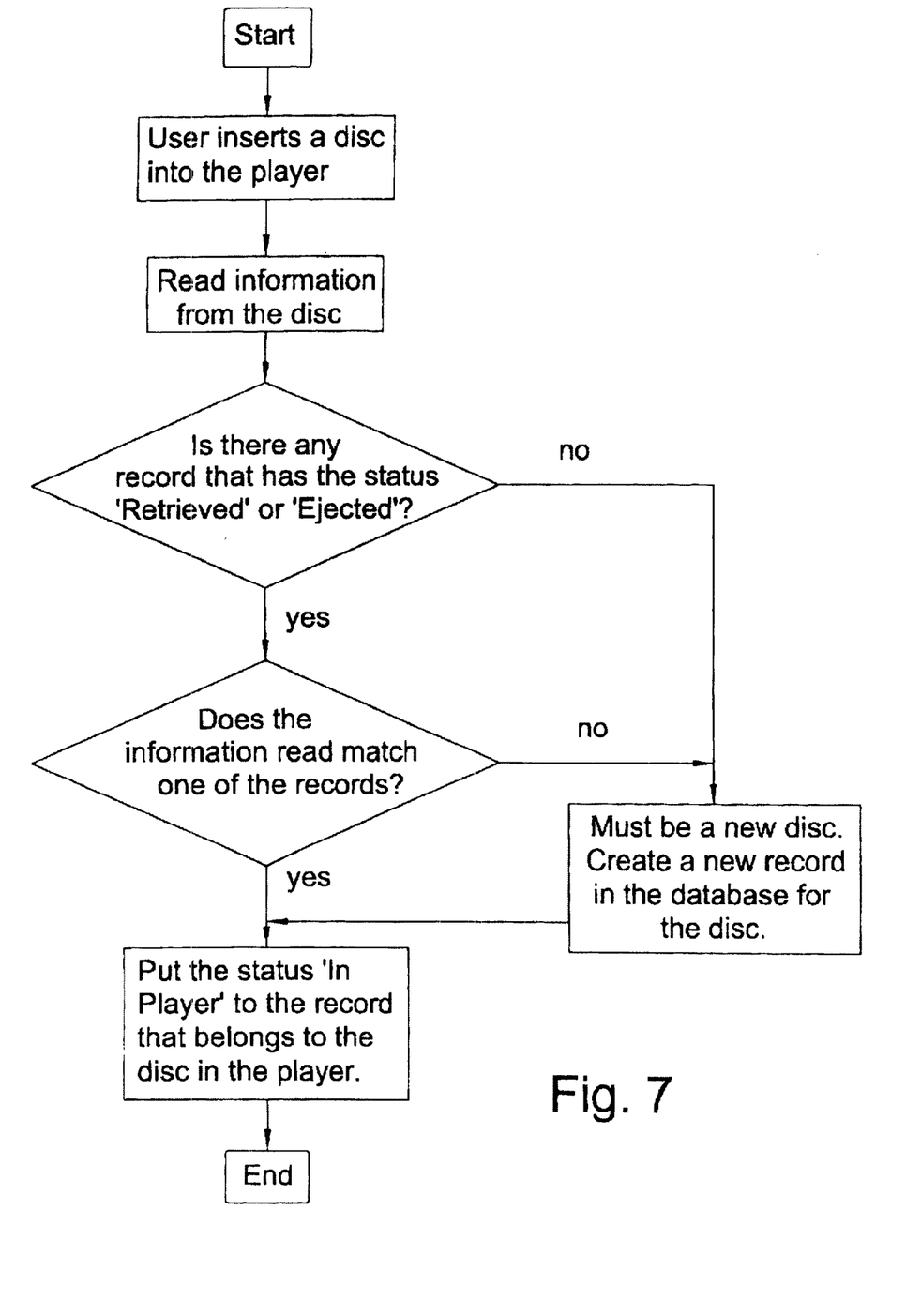
FIG. 7 is a flow chart for handling the placing of a disc into a player.

FIG. 7 outlines the handling of the placement of a disc into the player. The event is initiated by the user who places a disc into the player. Then, the disc management software reads identification information from the disc. A search is made in the database for records having the status "Retrieved" or "Ejected" corresponding to the disc which has been taken away from the multiple disc storage unit or from the player respectively. If there exists "Retrieved" of "Ejected" disc records, a matching comparison will be performed between the information read from the disc in the player and the information stored in those "Retrieved" and "Ejected" records. The matching record is the record that belongs to the disc in the player. Then the software will change the status of the record to "In Player". If no record can be found corresponding to the disc in the player, a new disc record storing the information read from the player will be created for the (new) disc. The status of the newly created record is of course "In Player".

Figure 8:
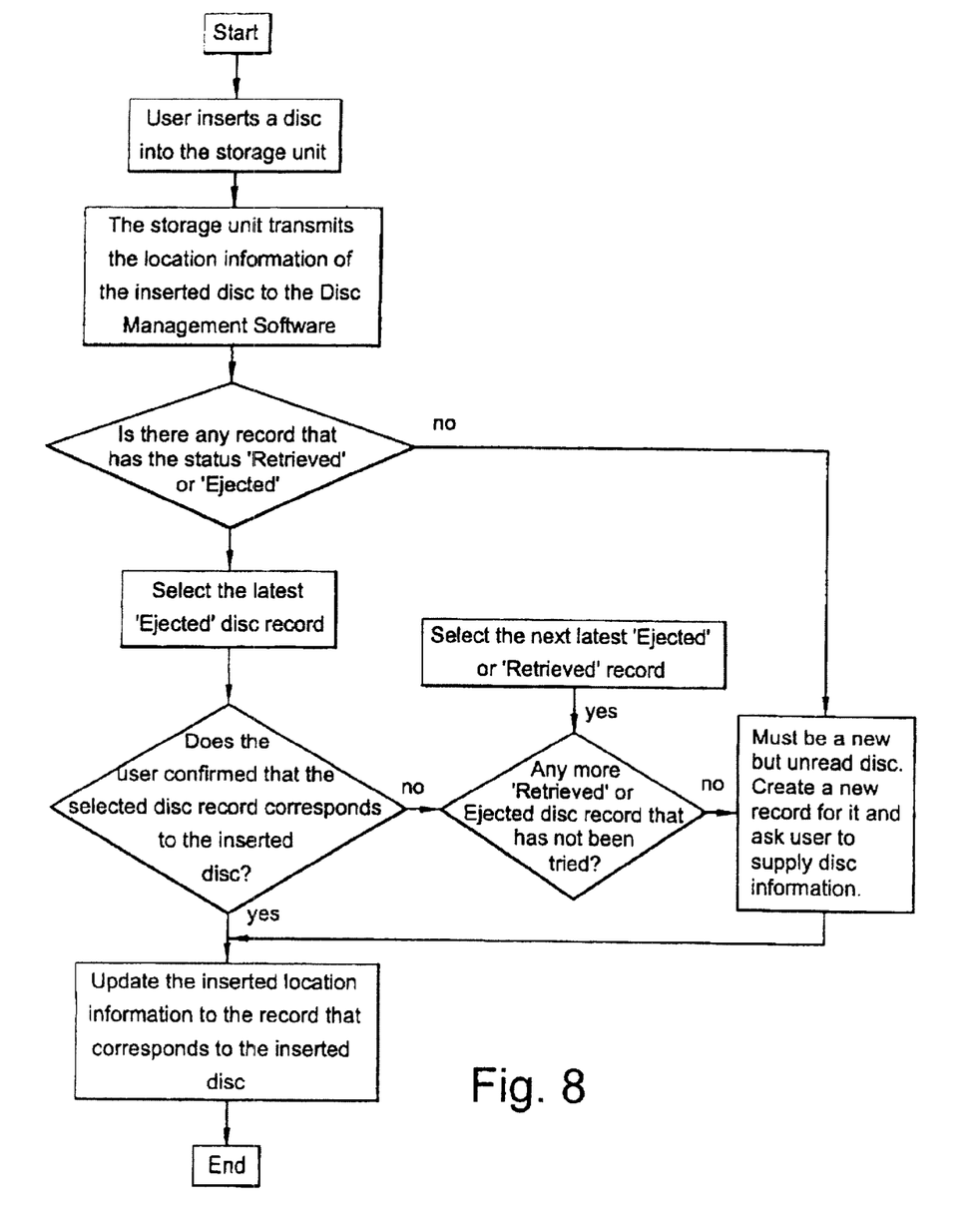
FIG. 8 is a flow chart for handling the insertion of a disc into the multiple disc storage unit.

FIG. 8 outlines the handling of the insertion of a disc into the multiple disc storage unit. The event is initiated by the user who inserts a disc into the multiple disc storage unit. Upon detection of a disc being inserted into an empty slot, the storage unit transmits the location of insertion information to the disc management software. Since it is most likely that the disc inserted into the storage unit is a disc that has just been ejected from the player, the disc management software will try to find the record corresponding to the latest ejected disc from the player. If the most likely record is found, the software will ask the user to confirm or will just proceed without confirmation according to the preference of the user. If the user answers "NO" during confirmation, the software will choose the next most likely record for repeating the confirmation or let the user to "click" the correct record directly. In case that no record can be found corresponding to the inserted disc, a new disc record will be created for it. Since there is no disc information available for this newly created record, the software will ask the user to take actions to supply the disc information or generate automatically a default identifying information for the record, if preferred by the user. Finally, the software writes the location information received from the storage unit to the record corresponding to the inserted disc.

Figures 9, 10:
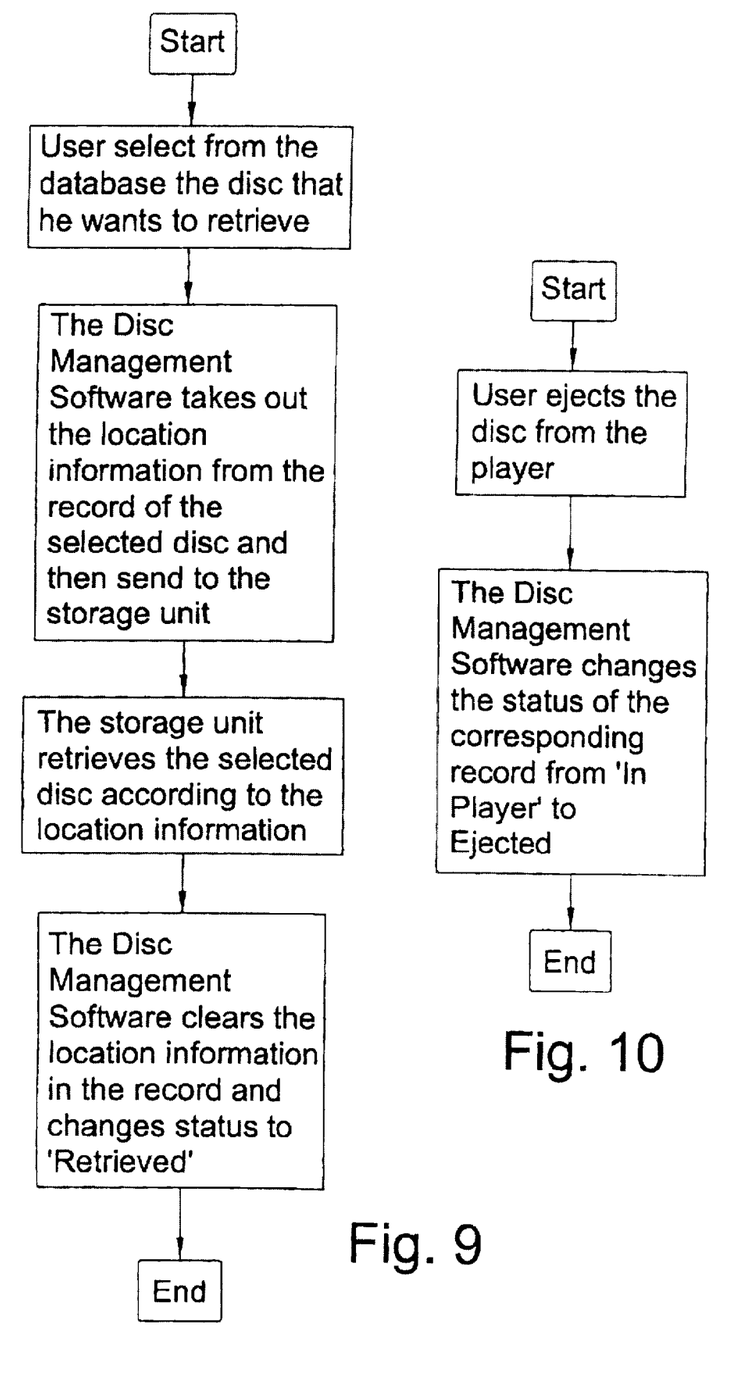
FIG. 9 is a flow chart for the handling of the command from the user to find and retrieve a disc from the multiple disc storage unit.
FIG. 10 is a flow chart for the handling of the ejection of the disc from the player.

FIG. 9 outlines the handling of the command from the user to find and retrieve a disc from the multiple disc storage unit. The user first finds the record of the desired disc from the database using the disc searching functions provided by the disc management software. When the record is found, the disc management software takes out the location information from the record and transmits it to the multiple disc storage unit. Upon receipt of the location information, the multiple disc storage unit moves ejector arm 25 vertically to that location and then turns the arm to eject the disc for the user to retrieve. Finally, the disc management software clears the location information from the disc's record and changes its status to "Retrieved".

FIG. 10 outlines the handling of the ejection of the disc from the player. Upon detection of the ejection of the disc from the player, the disc management software changes the status of the corresponding record from "In Player" to "Ejected".

It will be appreciated that the discs may be held in transportable holders, such as are known for multi-disc players already in use. In that case on selection of a disc (and receipt of the external signal by the storage unit), the required disc holder is released so that the disc can then be moved with the holder into a disc player, such mechanisms being known per se, and returned with its holder to the storage unit after play.

I claim:

1. A disc storage system comprising an automated disc storage unit capable of storing a large number of discs in respective individual slots and a disc sensor for detecting the presence of a disc in each slot while not detecting any content stored on each disc, the disc sensor having a plurality of mechanical springs, one for each disc, arranged to mechanically bias the discs into slots in the disc storage unit and an electrical circuit for sensing the relative position of each spring and means for transmitting the result of disc detection by the mechanical means to an external computer and means for selectively ejecting each disc under the control of an external signal, a disc player that is external to the storage unit, a storage system computer programmed to operate the disc player and to accept the disc detection result signals transmitted by the disc storage unit and to provide the external signals for the storage unit, and a non-volatile memory controlled by the computer for storing identifying information of each disc and a slot location where each disc is inserted.

2. A disc storage system according to claim 1 further comprising a fixed electrode for each spring, in which the electronic circuit responds to a capacitive coupling between each spring and a corresponding electrode which significantly increases in value due to a disc in the slot pressing the spring to adjacent the electrode.

* * * * *